(12) United States Patent
Downey

(10) Patent No.: US 7,970,610 B2
(45) Date of Patent: Jun. 28, 2011

(54) SPEECH RECOGNITION

(75) Inventor: Simon N Downey, Ipswich (GB)

(73) Assignee: British Telecommunication public limited company, London (GB)

( * ) Notice: Subject to any disclaimer, the term of this patent is extended or adjusted under 35 U.S.C. 154(b) by 882 days.

(21) Appl. No.: 10/472,897

(22) PCT Filed: Apr. 15, 2002

(86) PCT No.: PCT/GB02/01748
§ 371 (c)(1),
(2), (4) Date: Sep. 25, 2003

(87) PCT Pub. No.: WO02/086863
PCT Pub. Date: Oct. 31, 2002

(65) Prior Publication Data
US 2004/0117182 A1    Jun. 17, 2004

(30) Foreign Application Priority Data
Apr. 19, 2001   (EP) .................................. 01303598

(51) Int. Cl.
*G10L 15/00* (2006.01)
*G10L 15/06* (2006.01)
*G10L 17/00* (2006.01)

(52) U.S. Cl. ......... 704/246; 704/231; 704/243; 704/247

(58) Field of Classification Search .................. 704/246, 704/243, 247, 231; 379/88.01, 88.02
See application file for complete search history.

(56) References Cited

U.S. PATENT DOCUMENTS

| | | | | |
|---|---|---|---|---|
| 5,258,909 A * | 11/1993 | Damerau et al. | ............. | 715/257 |
| 5,488,652 A * | 1/1996 | Bielby et al. | ............. | 379/88.03 |
| 5,805,772 A * | 9/1998 | Chou et al. | .................... | 704/255 |
| 5,940,793 A * | 8/1999 | Attwater et al. | ............. | 704/231 |
| 5,999,902 A * | 12/1999 | Scahill et al. | ................. | 704/240 |
| 6,108,631 A * | 8/2000 | Ruhl | ............................. | 704/270 |
| 6,112,174 A * | 8/2000 | Wakisaka et al. | ............. | 704/251 |
| 6,192,337 B1 * | 2/2001 | Ittycheriah et al. | ........... | 704/231 |
| 6,208,965 B1 * | 3/2001 | Brown et al. | .................. | 704/246 |
| 6,405,172 B1 * | 6/2002 | Baker et al. | .................... | 704/270 |
| 6,483,896 B1 * | 11/2002 | Goldberg et al. | ........... | 379/88.01 |
| 6,937,982 B2 * | 8/2005 | Kitaoka et al. | ................. | 704/252 |
| 6,983,244 B2 * | 1/2006 | Junqua et al. | .................. | 704/231 |
| 2002/0049588 A1 * | 4/2002 | Bennett et al. | ................. | 704/235 |
| 2002/0107689 A1 * | 8/2002 | Liu | ............................... | 704/251 |

FOREIGN PATENT DOCUMENTS

WO   WO 96/13030      5/1996
WO   WO 02/086863 A1  10/2002

* cited by examiner

*Primary Examiner* — E. Yen
(74) *Attorney, Agent, or Firm* — Nixon & Vanderhye P.C.

(57) ABSTRACT

The vocabulary size of a speech recognizer for a large task is reduced by providing a recognizer only for the most common vocabulary items. Uncommon items are catered for by providing aliases from the common items. This allows accuracy to remain high while also allowing uncommon items to be recognized when necessary.

10 Claims, 5 Drawing Sheets

SPEECH RECOGNITION

This application is the US national phase of international application PCT/GB02/01748 filed 15 Apr. 2002 which designated the U.S.

BACKGROUND

1. Technical Field

The present invention is concerned with speech recognition, particularly although not exclusively for use in automated voice-interactive services for use over a telephone network.

2. Related Art

A typical application is an enquiry service where a user is asked a number of questions in order to elicit replies which, after recognition by a speech recogniser, permit access to one or more desired entries in an information bank. An example of this is a directory enquiry system in which a user, requiring the telephone number of a customer, is asked to give the town name and road name of the subscriber's address, and the customer's surname.

The problem with a system which is required to operate for a large number of customer entries, the whole of the UK which has about 500 thousand different surnames, for example, is that once the surname vocabulary becomes very large the recognition accuracy falls considerably. Additionally the amount of memory and processing power required to perform such a task in real time becomes prohibitive.

One way of overcoming this problem is described in our co-pending patent application EP 95934749.3 in which,
(i) the user speaks the name of a town;
(ii) a speech recogniser, by reference to stored town data identifies several towns as having the closest matches to the spoken town name, and produces a "score" or probability indicating the closeness of the match;
(iii) a list is compiled of all road names occurring in the identified towns;
(iv) the user speaks the name of a road;
(v) the speech recogniser identifies several road names, of the ones in the list, having the closest matches to the spoken road name, again with scores;
(vi) the road scores are each weighted accordingly to the score obtained for the town the road is located in, and the most likely "road" result considered to be the one with the best weighted score.

A disadvantage of such a system is that if the correct town is not identified as being one of the closest matches then the enquiry is bound to result in failure.

BRIEF SUMMARY

According to a first aspect of the present invention there is provided a method as set out in claim 1.

According to a second aspect of the present invention, there is provided a device as set out in claim 6.

According to a third aspect of the present invention, there is provided a device having corresponding apparatus features to the method features of any of claims 1 to 5.

According to a fourth aspect of the present invention, there is provided a method having corresponding method features to the apparatus features of any one of claims 6 to 9.

According to a fifth aspect of the present invention, there is provided a carrier medium as set out in claim 10.

BRIEF DESCRIPTION OF THE DRAWINGS

An embodiment of the present in invention will now be described with reference to the accompanying drawings in which.

DETAILED DESCRIPTION OF EXEMPLARY EMBODIMENTS

Figure 1:
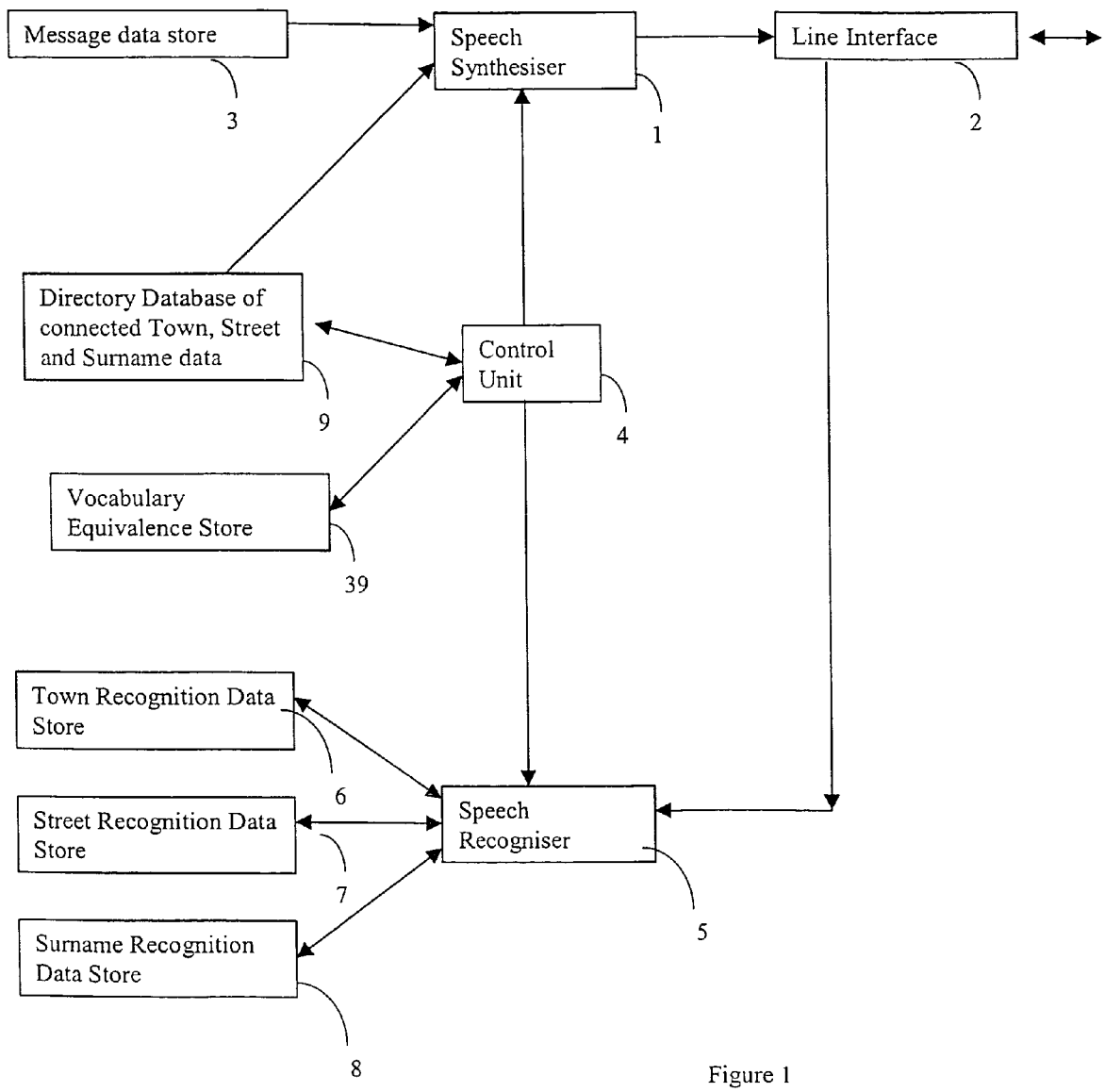
FIG. 1 illustrates an architecture for a directory enquiries system.

An architecture of a directory enquiry system will be described with reference to FIG. 1. A speech synthesiser 1 is provided for providing announcements to a user via a telephone line interface 2, by reference to stored, fixed messages in a message data store 3, or from variable information supplied to it by a main control unit 4. Incoming speech signals from the telephone line interface 2 are conducted to a speech recogniser 5 which is able to recognise spoken words by reference to, respectively, town name, road name or surname recognition data in recognition data stores of 6, 7, 8.

A main directory database 9 contains, for each telephone customer in the area covered by the directory enquiry service, an entry containing the name, address and telephone number of that customer, in text form. The town name recognition data store 6 contains, in text form, the names of all the towns included in the directory database 9, along with stored data to enable the speech recogniser 5 to recognise those town names in the speech signal received from the telephone line interface 2. In principle, any type of speech recogniser may be used, in this embodiment of the invention the recogniser 5 operates by recognising distinct phonemes in the input speech, which are decoded by reference to stored audio representations in the store 6 representing a tree structure constructed in advance from phonetic translations of the town names stored in the store 6, decoded by means of a Viterbi algorithm. The stores 7, 8 for road name recognition data and surname recognition data are organised in the same manner.

The audio representation may equally well be stored in a separate store which is referenced via data in stores 6, 7 and 8. In this case the audio representation of each phoneme referenced by the stores 6, 7 and 8 needs only to be stored once in said separate store Each entry in the town data store 6 contains, as mentioned above, text corresponding to each of the town names appearing in the database 9, to act as a label to link the entry in the store 6 to entries in the database 9 (though other kinds of label may be used if preferred). If desired, the store 6 may contain an entry for every town name that the user might use to refer to geographical locations covered by the database, whether or not all these names are actually present in the database. Noting that some town names are not unique (there are four towns in the UK called Southend), and that some town names carry the same significance (e.g. Hammersmith, which is a district of London, means the same as London as far as entries in that district are concerned), a vocabulary equivalence store 39 is also provided, containing such equivalents, which can be consulted following each recognition of a town name, to return additional possibilities to the set of town names considered to be recognised. For example if "Hammersmith" is recognised, London is added to the set; if "Southend" is recognised, then Southend-on-Sea, Southend (Campbeltown), Southend (Swansea) and Southend (Reading) are added.

The equivalence data store 39 could, if desired, contain similar information for roads and surnames, or first names if these are used; for example Dave and David are considered to represent the same name.

As an alternative to this structure, the vocabulary equivalence data store 39 may act as a translation between labels used in the name stores 6, 7, 8 and the labels used in the database (whether or not the labels are names in text form).

The use of text to define the basic vocabulary of the speech recogniser requires that the recogniser can relate one or more textual labels to a given pronunciation. That is to say in the case of a 'recognition tree', each leaf in the tree may have one or more textual labels attached to it.

Attaching several textual labels to a particular leaf in the tree is a known technique for dealing with equivalent ways of referring to the same item of data in a database as described above. The technique may also be used for dealing with homophones (words which are pronounced in the same way but spelled differently) for example, "Smith" and "Smyth".

Surname data of the population of the UK, and probably many other areas, is skewed, in that all surnames are not equally likely. In fact of the approximately 500 thousand surnames used in the UK, about 50 thousand (i.e. 10%) are used by about 90% of the population. If a surname recogniser is used to recognise 500 thousand surnames then the recognition accuracy is reduced significantly for the benefit of the 10% of the population who have unusual names.

Figure 2:
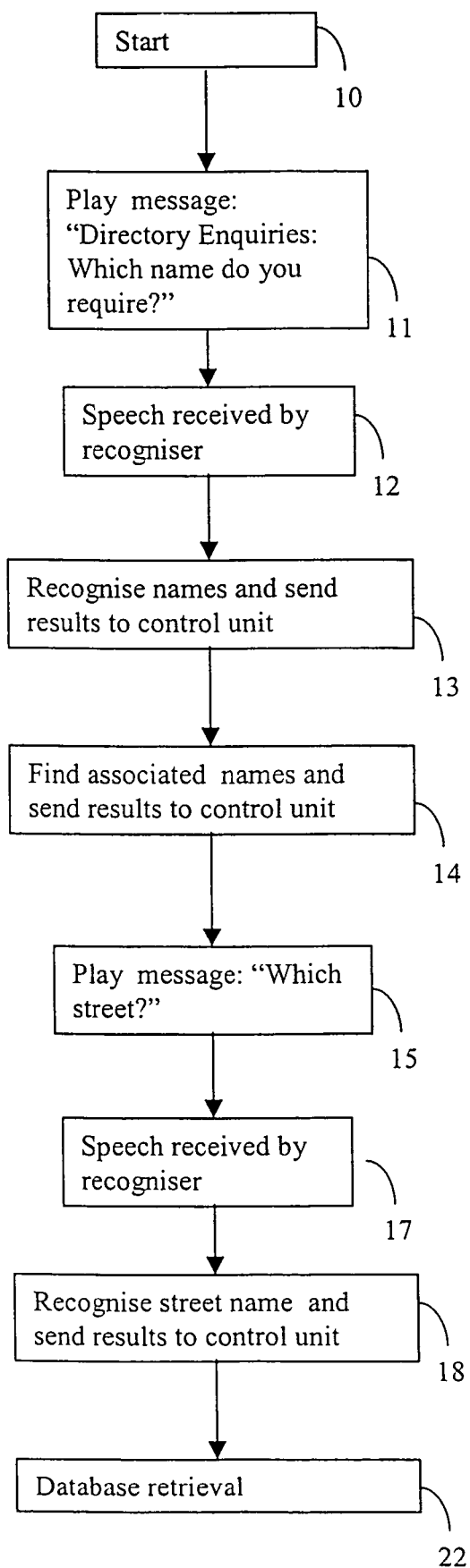
FIG. 2 is a flow chart illustrating the operation of the directory enquiries system of FIG. 1 using the method according to the present invention.

In this embodiment of the invention the recognition data store 8 contains audio representations of about 50 thousand surnames which correspond to the surnames of about 90% of the population of the UK. Several textual labels are associated with a particular audio representation by attaching textual labels to a particular leaf in a tree. These textual labels represent surnames which sound similar to said particular audio representation. Therefore a list of surnames are provided which sound similar to the surname which is represented by a particular audio representation, but which are not themselves represented by audio data in the store 8. Therefore a greater number of surnames are represented by a smaller data structure, thus reducing the amount of memory required. Furthermore the amount of processing power required is much less and it is possible to perform the speech recognition in real time, using a less powerful processor. Another advantage is that the recognition accuracy for these most popular 10% of names remains much higher than if the remaining 90% of names were also represented in the store 8. In the remainder of this description the most popular 10% of surnames will be referred to as 'common surnames' and the remaining 90% of surnames will be referred to as 'uncommon surnames'. It will be understood that different percentages could be used, and that the percentages used may depend upon the characteristics of the particular data being modelled The operation of the directory enquiry system of FIG. 1 is illustrated in the flow chart of FIG. 2. The process starts (10) upon receipt of an incoming telephone call signalled to the control unit 4 by the telephone line interface 2; the control unit responds by instructing the speech synthesiser 1 to play (11) a message stored in the message store 3 requesting the caller to give the required surname. The caller's response is received (12) by the recogniser. The recogniser 3 then performs its recognition process (13) with reference to the audio representations stored in the store 8. For common surnames which meet a prescribed threshold of similarity with the received reply any associated uncommon surnames are determined (14) by reference to the town recognition data store 6.

All of the common surnames which meet a prescribed threshold of similarity with the received reply, together with any uncommon surnames which are associated with the audio representations of these common surnames are then communicated to the control unit 4.

The control unit 4 then instructs the speech synthesiser to play (15) a further message from the message data store 3 requesting the required street name. A further response, relating to the street name, is received (17) from the caller and is processed by the recogniser 3 utilising the data store 7 and the recogniser then communicates to the control unit 4 a set of all of the road names which meet a prescribed threshold of similarity with the received reply.

The control unit 4 retrieves (20) from the database 9 a list of all customers having any of the surnames in the set of surnames received by the control unit at step 14 and residing in any of the street names received by the control unit at step 18.

For example, the speech signal received at step 12 is an utterance of the uncommon surname 'Dobson'. The set of words which meet the prescribed threshold of similarity with the received reply includes the common surname 'Robson'. 'Robson' is associated with similar sounding surnames 'Hobson, Dobson and Fobson'. The speech signal received at step 17 is an utterance of the street name 'Dove Street'. The set of words which meet the prescribed threshold of similarity with the received reply includes the street name 'Dove Street'. However there is no customer with the name 'Robson' living in 'Dove Street', but there is a customer named 'Dobson' living in 'Dove Street' therefore the database retrieval at step 22 retrieves the details for customer 'Dobson' in 'Dove Street' even though the name recognition data store 8 does not contain an audio representation for the name 'Dobson'.

It is worth noting at this point that similar sounding names, for example Roberts and Doberts may both exist in the set of common surnames and may in fact each have an identical list of associated uncommon surnames as the other one.

Figure 3:
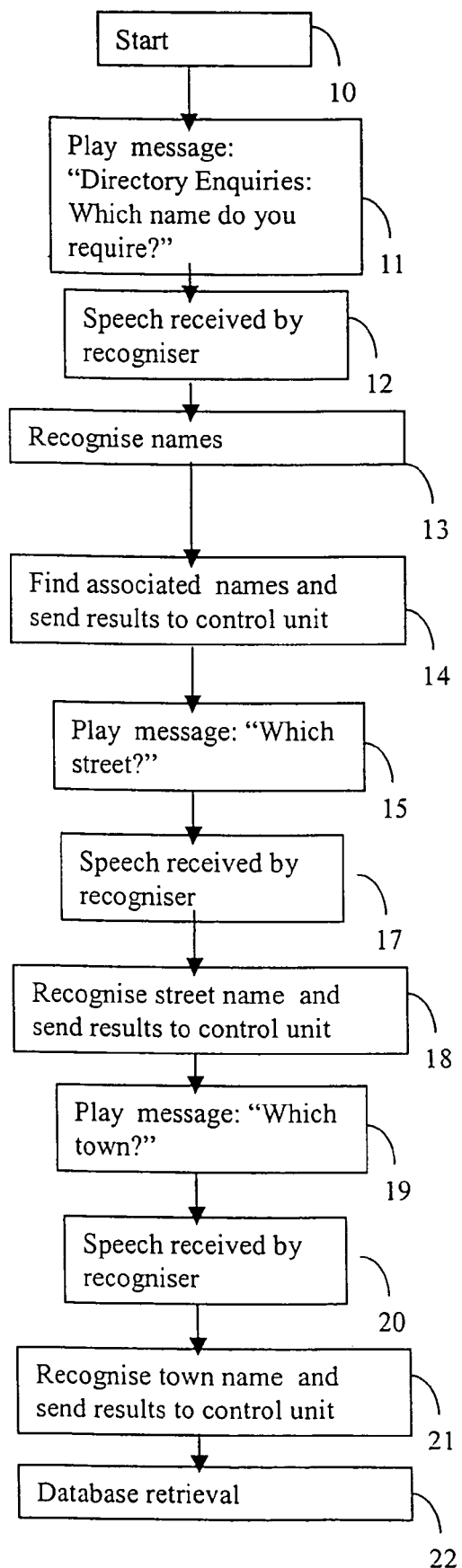
FIG. 3 is a second flowchart illustrating the operation of the directory enquiries system of FIG. 1 in using a second embodiment of a method according to the present invention.

In fact, in a practical application relating to a large area (for example the whole of the UK) the directory enquiries system would operate as illustrated in FIG. 3, where further information relating to the town name is requested from the caller at step 19. A further response, relating to the town name, is received (20) from the caller and is processed (21) by the recogniser 3 utilising the data store 6 and the recogniser then communicates to the control unit 4 a set of all of the town names which meet a prescribed threshold of similarity with the received reply. This set of town name data is then used, along with street name and surname data in the database retrieval step 22. If data relating to more than one customer is retrieved from the database then further information may be elicited from the user (steps not shown).

In another embodiment of the invention the speech recogniser 5 provides a score as to how well each utterance matches each audio representation. This score is used to decide which customer data is more likely in the case where data relating to more than one customer is retrieved from the database. In the case of associated uncommon surname the score used can be weighted according to statistics relating to that surname such that the more uncommon a surname is the smaller the weighting factor applied to the score from the recogniser 5.

Figure 4:
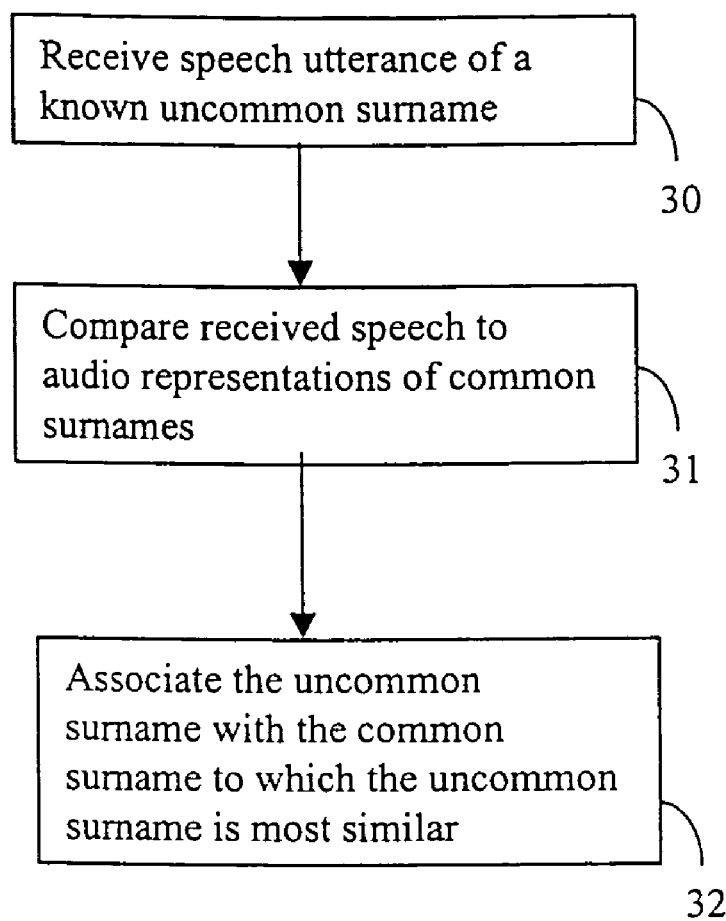
FIG. 4 is a flow chart illustrating a method of generating association between surnames which do not have an audio representation stored in the store 8 of FIG. 1 and surnames which do have an audio representation stored in the store 8.

FIG. 4 is a flow chart illustrating a method of generating associations between uncommon surnames and common surnames for use in this invention. At step 30 a speech utterance of a known uncommon surname is received by a speech recogniser, which may be any type of speech recogniser including a phoneme based speech recogniser as described earlier. The received speech utterance is compared with audio representations of the common surnames at step 31, and at step 32 an association is made between the known uncommon surname and the common surname to which the speech recogniser determines that the unknown surname is most similar.

Figure 5:
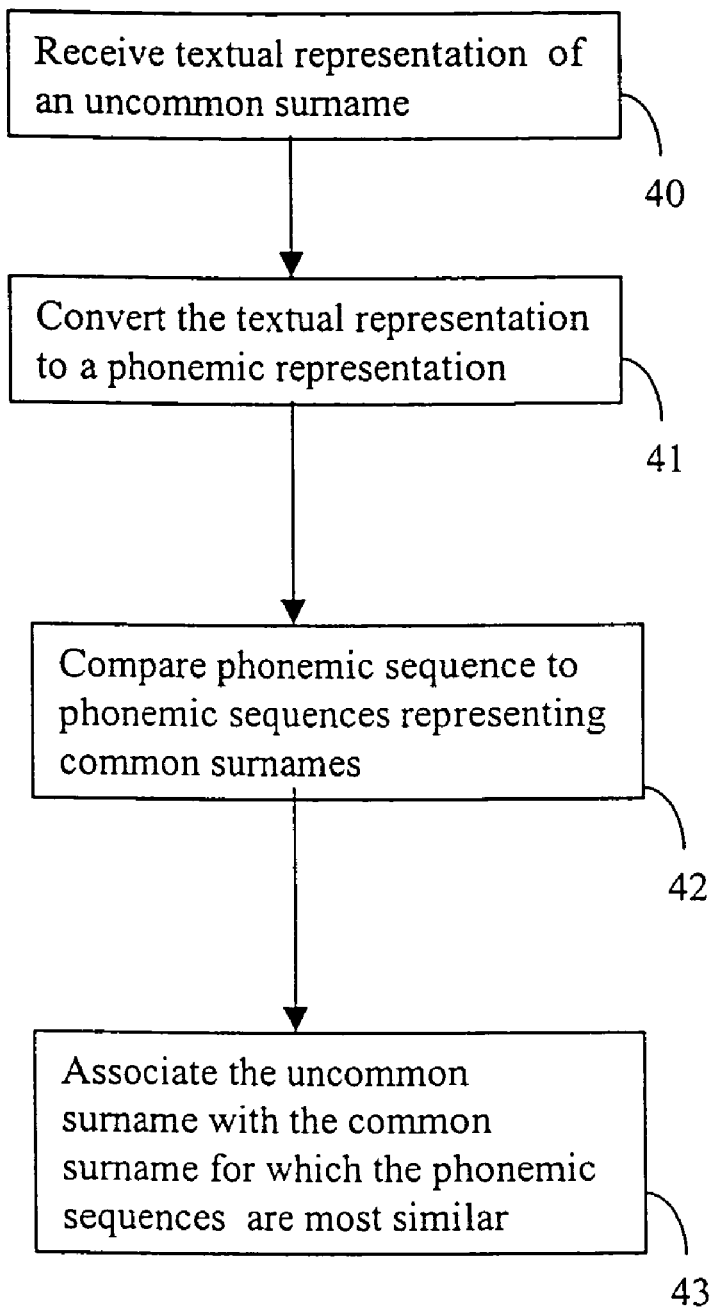
FIG. 5 is a flow chart illustrating a second method of generating association between surnames which do not have an audio representation stored in the store 8 of FIG. 1 and surnames which do have an audio representation stored in the store 8.

FIG. 5 illustrates an alternative method of generating associations between uncommon and common surnames for use in the invention. At step 40 a textual representation of an uncommon surname is received. At step 41 this textual representation is converted into a phoneme sequence. Such a conversion my be done using a large database associating text to phoneme sequences. The conversion also may be done using letter to sound rules for example as described in Klatt D, 'Review of text-to-speech conversion for English', J acoustic Soc Am 82, No. 3 pp 737-793. September 1987. The phoneme sequence representing the uncommon surname is then compared to all the phoneme sequences for common surnames for example using a dynamic programming technique such as that described in "Predictive Assessment for Speaker Independent Isolated Word Recognisers" Alison Simons, ESCA EUROSPEECH 95 Madrid 1995 pp 1465-1467. Then at step 43 the uncommon surname is associated with the common surname for which the phonemic sequences are found to be most similar.

Using either of the above techniques (or any other) the association may be recorded by associating a label representing the known uncommon surname to a leaf in the common surname recognition tree, if a tree based phoneme recogniser is to be used in the directory enquiries system, or by use of a vocabulary equivalence store as discussed previously.

An advantage of the second technique is that it is not necessary to collect speech data relating to all of the possible uncommon surnames in the database, which is a time consuming exercise. Instead all that is needed is a textual representation of such uncommon surnames. In order to take into account the particular characteristics of a particular speech recogniser it is possible to use a phoneme confusion matrix which records the likelihood of a particular recogniser confusing each phoneme with every other phoneme. Such a matrix is used in the comparison step 42 as described in the above referenced paper.

It will be understood that the use of common and uncommon surnames in a directory enquiries system is merely an example of how this invention may be used. Application of the invention may be found in any voice operated database access system, where the frequency of certain items of data is much greater than the frequency of other items of data.

Furthermore the technique could be extended to cover other pattern matching areas such as image retrieval again where the frequency of requests for certain items of data are likely to be much greater than requests for other items of data.

What is claimed is:

1. A device for retrieving a data record from a database storing a plurality of data records, each of a plurality of which includes a data item of a first category and a data item of a second or subsequent category, wherein the data items in the first category are designated as being either common or uncommon in dependence upon the frequency with which they appear in the data records stored in the database, the device comprising:
   audio representation storage storing an audio representation in respect of each of the common data items in the first category but not in respect of the uncommon data items in the first category;
   association storage storing associations between each of at least some common data items and a plurality of uncommon data items whose audio representations are similar to but different from the audio representation of the respective associated common data item;
   a comparator which compares a signal derived from an unknown utterance with each of the audio representations of common data items stored in the audio representation storage, generating a measure of similarity at least in respect of one or more audio representations which are sufficiently similar to the compared signal to give rise to a measure of similarity above a predetermined threshold and designating as candidate first category data items both the common data items whose audio representations gave rise to a measure of similarity above the threshold and the uncommon data items associated with the designated common data items according to the association storage means;
   a selector which selects one or more data items of a second or subsequent category; and
   a data retriever which retrieves one or more data records including a first category data item equal to one of the candidate first data items designated by the comparator and a second or subsequent category data item selected by the selector.

2. A device according to claim 1 wherein the comparator includes a speech recognition device connected to a public switched telephone network for receiving the signal via the public switched telephone network from a user using a terminal connected to the network, said user uttering the unknown utterance.

3. A device according to claim 2 wherein the selector also includes a speech recognition device connected to a public switched telephone network for receiving the signal via the public switched telephone network from a user using a terminal connected to the network, said user uttering the unknown utterance.

4. A device as claimed in claim 1 wherein the database stores a plurality of records each of which includes the name of a customer as an item of data of the first category.

5. A computer implemented method of speech recognition, said method comprising:
   a) comparing, using at least one computer processor, a representation of a first input unknown speech utterance with audio representations of a first set of stored data items of a first category to identify at least one first recognized data item candidate;
   b) if said first recognized data item candidate has a previously stored association with one or more other data items of the first category having similar, but different, audio representations thereof, also identifying said associated other data items of the first category as additional first recognized data item candidates without comparison of an audio representation thereof with said representation of said first unknown speech utterance;
   c) comparing a representation of a second input unknown speech utterance with audio representations of a second set of stored data items of a second category different than said first category to identify at least one second recognized data item candidate; and
   d) outputting a speech recognition output selectively based on said first and second recognized data item candidates.

6. A method of speech recognition as in claim 5 wherein:
   said first set of stored data items of the first category comprise names of persons;
   said associated other data items of the first category comprise additional names of persons that are less frequently encountered than a respectively associated name in said first set; and
   said second set of stored data items identify geographical locations.

7. A method as in claim 6, wherein said geographical locations are at least one of a group comprising: streets, roads, cities, counties and countries.

8. A method as in claim 5 wherein:
   speech recognition step c) is repeated for at least one further unknown speech utterance using respectively corresponding further sets of stored data items and the results of all speech recognition steps are utilized in step d).

9. A method as in claim 5 wherein:

said first set of stored data items of the first category comprise common data items; and said associated other data items of the first category uncommon data items.

10. A non-transitory computer readable medium tangibly storing computer readable instructions for causing a computer processing system to perform the method of claim 5.

* * * * *